United States Patent [19]

Gellert

[11] Patent Number: 4,663,811
[45] Date of Patent: May 12, 1987

[54] MANUFACTURING METHOD FOR SELECTED GATE CONFIGURATION INJECTION MOLDING NOZZLES

[76] Inventor: Jobst U. Gellert, 7A Prince Street, Georgetown, Ontario, Canada, L7G 2X1

[21] Appl. No.: 812,300

[22] Filed: Dec. 23, 1985

[51] Int. Cl.⁴ .......................................... B21D 53/00
[52] U.S. Cl. ................................ 29/157 C; 29/527.6; 29/DIG. 5; 425/549; 425/564; 425/566; 425/568; 425/572
[58] Field of Search ................. 29/611, 157 C, 157 R, 29/527.5, 527.6, DIG. 5; 425/549, 562, 564, 566, 568, 572

[56] References Cited

U.S. PATENT DOCUMENTS

| | | | |
|---|---|---|---|
| 4,053,271 | 10/1977 | Gellert | 425/562 |
| 4,344,750 | 8/1982 | Gellert | 425/548 |
| 4,403,405 | 9/1983 | Gellert | 29/611 |
| 4,424,622 | 1/1984 | Krause | 425/566 X |
| 4,433,969 | 2/1984 | Gellert | 425/548 |
| 4,446,360 | 5/1984 | Gellert | 219/421 |
| 4,557,685 | 12/1985 | Gellert | 425/549 |
| 4,579,520 | 4/1986 | Gellert | 425/549 |

FOREIGN PATENT DOCUMENTS 1174020 9/1984 Canada .

Primary Examiner—Howard N. Goldberg
Assistant Examiner—Ronald S. Wallace
Attorney, Agent, or Firm—Riches, McKenzie & Herbert

[57] ABSTRACT

This invention relates to an improved method of making nozzles for injection molding. The nozzles are heated by an electrical heating element which is cast in a copper portion between inner and outer stainless steel portions. The method includes making a main rear portion and a steel nose cap portion separately, brazing them together in a vacuum furnace to form an integral unit, and then finishing it by drilling and machining to provide it with a central bore and a particular gating configuration. This method has the advantage that a single inventory of unfinished nozzles can be maintained, from which a requirement for one of several gating configurations can be quickly supplied by finishing the nozzles according to that configuration.

12 Claims, 8 Drawing Figures

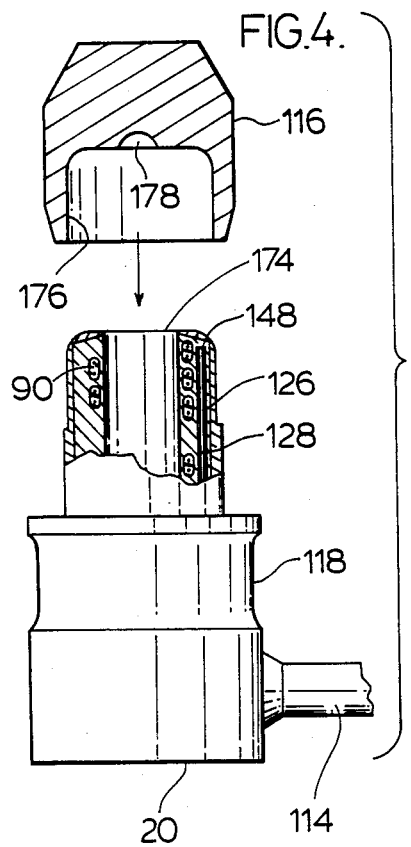
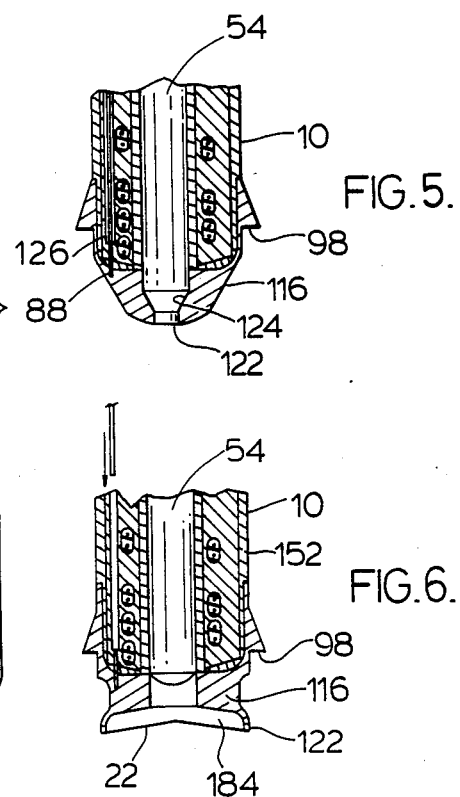
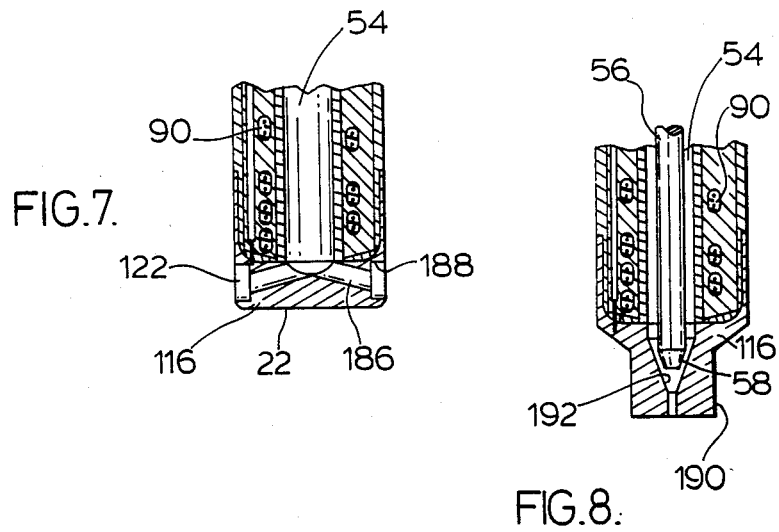

MANUFACTURING METHOD FOR SELECTED GATE CONFIGURATION INJECTION MOLDING NOZZLES

BACKGROUND OF THE INVENTION

This invention relates generally to injection molding and more particularly to an improved method of manufacturing electrically heated nozzles to have a selected one of a number of different gating configurations.

Nozzles of this general type and methods of making them are well known. The basic nozzle and method are described in the applicant's U.S. Pat. Nos. 4,403,405 which issued Sept. 13, 1983 and U.S. Pat. No. 4,446,360 which issued May 1, 1984. A more recently improved method is shown in the applicant's Canadian Pat. No. 1,198,266 which issued Dec. 24, 1985. However, all of these previous methods have the disadvantage that each nozzle has to be made differently to provide a different gating configuration. While these nozzles are commonly used for valve gating and sprue gating, a type of edge gating configuration using hollow edge seals is shown in the applicant's U.S. Pat. No. 4,344,750 which issued Aug. 17, 1982. Another gating configuration which provides a variable size gate is described in the applicant's U.S. Pat. No. 4,579,520 which issued Apr. 1, 1986 entitled "Injection Molding Valve Gated System". The methods of manufacturing nozzles with each of these different gating configuration each involve a number of steps and somewhat different components. Thus, previously it has been necessary to manufacture and maintain a considerable inventory of nozzles for each different type of gating configuration being sold. it will be appreciated that this involves a considerable cost and inevitably there are shortages of one type of nozzle and an excess of another type, depending upon demand.

SUMMARY OF THE INVENTION

According, it is an object of the present invention to at least partially overcome the disadvantages of the prior art by providing an improved method of manufacturing nozzles in which identical components are used and only the final step is varied in producing nozzles of different configurations for several different gating methods. This provides the advantage that a larger inventory of nearly completed nozzles can be maintained, and the final step of the method to produce nozzles for different gating configurations can be varied depending upon the immediate demand.

To this end, in one of its aspects, the invention provides a method of manufacturing an injection molding nozzle to have a selected one of several gating configurations, the nozzle being elongated with rear and forward ends and having a helical electrical heating element integrally cast in a highly thermally conductive portion between corrosion resistant inner and outer portions, the inner portion having a central bore to convey melt from an inlet at the rear end to the selected gating configuration at the forward end having at least one outlet, comprising the steps of forming a main rear portion of the nozzle by assembling the helical heating element in a space between a corrosion resistant inner member and a corrosion resistant outer member, sealing the space against leakage during casting, casting highly thermally conductive material into the space to form an integral structure, and machining the rear portion to have a forward end of a predetermined shape; forming a steel forward nose cap portion with a rear end shaped to fit the forward end of the main rear portion, the nose cap portion being of sufficient size to provide any of the several gating configurations; fitting the rear portion and the nose cap portion together after applying brazing material between them, and heating them under a partial vacuum for a sufficient period of time and at a temperature to integrally braze the steel nose cap portion onto the main rear portion; and drilling and machining the nozzle to form the central bore which extends from the rear end of the nozzle, and to provide the nose cap portion with the predetermined selected gating configuration to connect the central bore with at least one outlet leading to a gate.

Further objects and advantages of the invention will appear from the following description taken together with the accompanying drawings.

FIG. 4 is a sectional view showing the completed main rear portion with a nose cap portion in position to be fitted onto it;

FIG. 5 is a sectional view showing the forward end of a completed nozzle which has been finished to provide a valve gating configuration as seen in FIG. 1;

FIG. 6 is a sectional view showing the forward end of a completed nozzle which has been finished to provide a first edge gating configuration;

FIG. 7 is a sectional view showing the forward end of a completed nozzle which has been finished to provide a second edge gating configuration; and FIG. 8 is a sectional view showing the forward end of a completed nozzle which has been finished to provide a variable gate size configuration.

DESCRIPTION OF THE PREFERRED EMBODIMENTS

Figure 1:
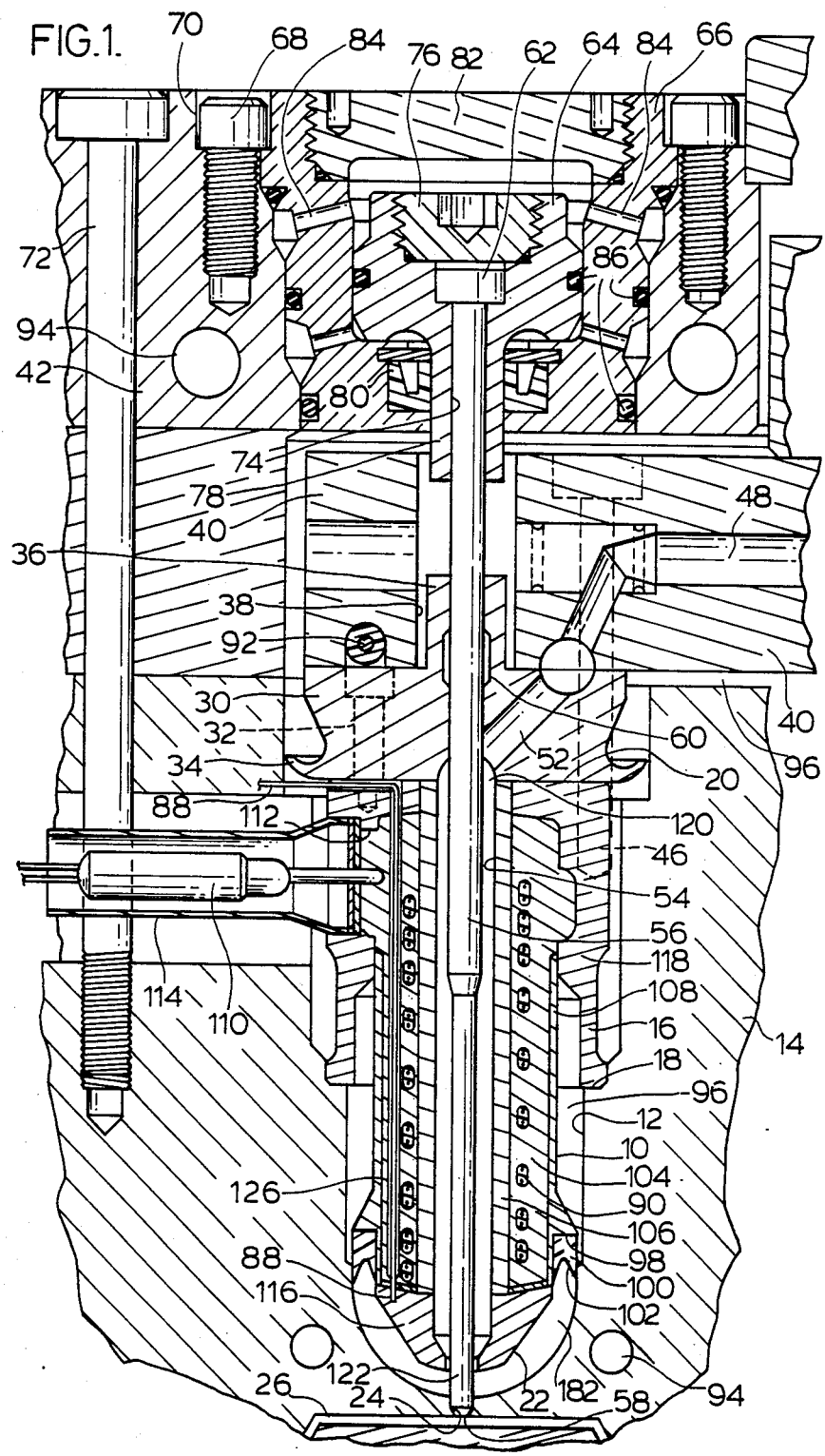
FIG. 1 is a sectional view of a portion of a multi-cavity valve gated injection molding system showing a nozzle manufactured according to a preferred embodiment of the invention.

Reference is first made to FIG. 1 which shows one nozzle 10 made according to the present invention as part of a multi-cavity valve gated injection molding system. Each nozzle 10 is seated in a well 12 in a cavity plate 14 and has an insulation bushing portion 16 which is seated against circumferential shoulder 18 to accurately locate it in position. Each nozzle 10 has a rear end 20 and a forward end 22 which is in alignment with a gate 24 leading to a respective cavity 26 between the cavity plate 14 and the movable mold platen 28. As described in the applicant's U.S. Pat. No. 4,433,969 which issued Feb. 28, 1984, a steel valve bushing 30 is secured to the rear end 20 of the nozzle 10 by bolts 32. The valve bushing 30 has a narrow flanged portion 34 which keeps it in proper alignment in the well 12. The valve bushing 30 also has a cylindrical collar portion 36 which extends into an opening 38 in the manifold 40. The elongated manifold 40 is generally rectangular in shape and made of steel by the method described in the applicant's U.S. Pat. No. 4,609,138 which issued Sept. 7, 1986 entitled "Method of Manufacturing Injection Molding Manifold with Plugs". The manifold 40 is located between the cavity plate 14 and a back plate 42 and is secured to the valve bushing 30 and the nozzle 10 by bolts 46. Clearance is provided around the collar portion 36 of the valve bushing 30 to avoid interference as a result of thermal expansion of the manifold.

The system has a melt passage 48 which extends from an inlet 50 (not shown) and branches out in the manifold 40 to the respective nozzles 10. As described in the above mentioned U.S. Pat. No. 4,433,969, the melt passage 48 extends through a diagonal melt duct 52 which joins a central bore 54 extending through the nozzle 10 and the valve bushing 30. As described below, an elongated valve pin 56 extends through this central bore 54 and has a tapered tip end 58 which seats in the gate 24. The bore 54 through the nozzle 10 is sufficiently larger in diameter than the valve pin 56 to provide for the flow of melt around the valve pin 56 to the gate 24. However, through the valve pin bushing 30 the bore 54 is smaller in diameter to fit to provide a seal around the valve pin 56 rearwardly of where the diagonal melt duct 52 joins the bore 54. The bore 54 through the valve bushing 30 is interrupted by a circumferential opening 60 which is vented to atmosphere (not shown). This relieves any build up of pressure and allows any corrosive gases to escape which are generated by the decomposition of melt which is trapped around the valve pin and subjected to shearing action by the reciprocal motion of the valve pin 56.

The valve pin 56 has an enlarged driven end 62 which is engaged by hydraulic actuating mechanism seated in the back plate 42. The actuating mechanism includes a piston 64 which reciprocates in a cylinder 66 seated in the back plate 42. The cylinder is fixed to the back plate 42 by bolts 68 extending through a collar portion 70, and the back plate 42 is secured with the mold in position by bolts 72. The valve pin 56 extends through a hole 74 in the piston 64 and is secured to it by a threaded plug 76 which screws into the piston 64 and also seals against leakage of the hydraulic fluid. The piston has an elongated neck portion 78 which extends into the opening 38 in the manifold 40, and a V-shaped high temperature seal 80 seated in the cylinder 66 prevent leakage of pressurized hydrualic fluid around it. The cylinder 66 has a threaded cap 82 which is larger in diameter than the piston 64 so that the piston 64 and valve pin 56 can be removed if necessary. Pressurized hydraulic fluid is supplied to the cylinder 66 on opposite sides of the piston 64 through ducts 84 from a controlled source (not shown) to reciprocate the piston according to a predetermined cycle. In the forward closed position the valve pin tip end 58 is sealed in the gate 24, while in the retracted open position the piston abuts against the cap 82. O-rings 86 are also provided to prevent leakage of the pressurized hydraulic fluid around the piston 64 and the cylinder 66.

As is well known, it is critical that the melt flowing through the melt passage 48 be kept within a narrow temperature range until it flows through the gate 24 into the cavity 26 in the cooled cavity plate 14. Thus, the nozzle 10 is provided with a thermocouple 88 and a helical electrical heating element 90 which will be described in more detail below. Also, an electric heating element 92 is cast in copper in a channel in one of the surfaces of the manifold 40 by a method as described in the applicant's Canadian Pat. No. 1,174,020 which issued Sept. 11, 1984. In order to cool the cavity plate 14 and the back plate 42 in which the actuating mechanism is seated, water is pumped through cooling conduits 94 in a conventional manner. As is well known, an insulative air space 96 is provided betweem the heated manifold 40 and nozzle 10 and the cooled cavity plate 14 and back plate 42. In order to reduce heat loss, minimal metal to metal contact is provided through the insulation bushing portion 16 of the nozzle, the narrow flanged portion 34 of the valve bushing 30. As will be described below, in the valve gating configuration illustrated in FIG. 1, the nozzle 10 is machined to provide a circumferential seat or shoulder 98 to receive a hollow cylindrical seal 100. The seal 100 has a V-shaped lower surface 102 which bridges the air space 96 around the nozzle 10, and is formed of an alloy of titanium to reduce heat loss. As described in the applicant's U.S. Pat. No. 4,053,271 which issued Oct. 11, 1977, this seal 100 prevents the pressurized melt from filling the whole air space around the nozzle 10 during use.

As seen in FIG. 1, each nozzle 10 has the helical heating element 90 integrally cast in a copper portion 104 between a stainless steel inner portion 106 and a stainless steel outer portion 108. The electrical heating element 90 has a cold terminal portion 110 which extends out through an opening 112 in the outer portion 108 and is surrounded by a protective sleeve 114. As more clearly described below with particular reference to FIG. 4, the nozzle 10 is made by integrally brazing a steel nose cap portion 116 onto a previously finished main rear portion 118. In the particular gating configuration shown in FIG. 1 (and also in FIG. 5), the bore 54 extends centrally through both the main rear portion 118 and the nose cap portion 116 from an inlet 120 at the rear end 20 of the nozzle to an outlet 122 at the forward end 22 of the nozzle. While the central bore 54 is generally cylindrical, it does have a reduced tapered portion 124 adjacent the outlet 122. A steel thermocouple receiving sleeve 126 is also cast into the copper portion 104 to extend between the helical heating element 90 and the outer portion 108. The thermocouple receiving sleeve 126 has an internal thermocouple receiving bore 128 which is extended into the steel nose cap portion 116 to receive the removable thermocouple 88 to measure the temperature adjacent the forward end 22 of the nozzle 10.

In use, the system is assembled as shown in FIG. 1 and electrical power is applied to the terminal portion 110 of the nozzle electric heating element 90 and to the manifold heating element 92 to heat them to a predetermined operating temperature. Pressurzied melt is then introduced into the melt passage 48 from a molding machine (not shown) positioned at the recessed inlet. Melt pressure is controlled according to a predetermined cycle in conjunction with the application of controlled hydraulic pressure to the actuating mechanism, in a conventional manner. After sufficient melt has been injected to fill the cavity 26, injection pressure is held for a short period of time to pack. Hydraulic pressure is then applied to the piston 64 to drive the valve pin 56 to the closed position with its tip end 58 seated in the gate 24. The melt pressure is then reduced and a short cooling period is provided before the mold is opened for ejection. After ejection, the mold is closed again and hydraulic pressure is applied to the piston to retract the valve pin to the open position as the melt injection pressure is reapplied. This molding cycle is repeated continuously at a rate that the geometry of the part permits.

Figure 2:
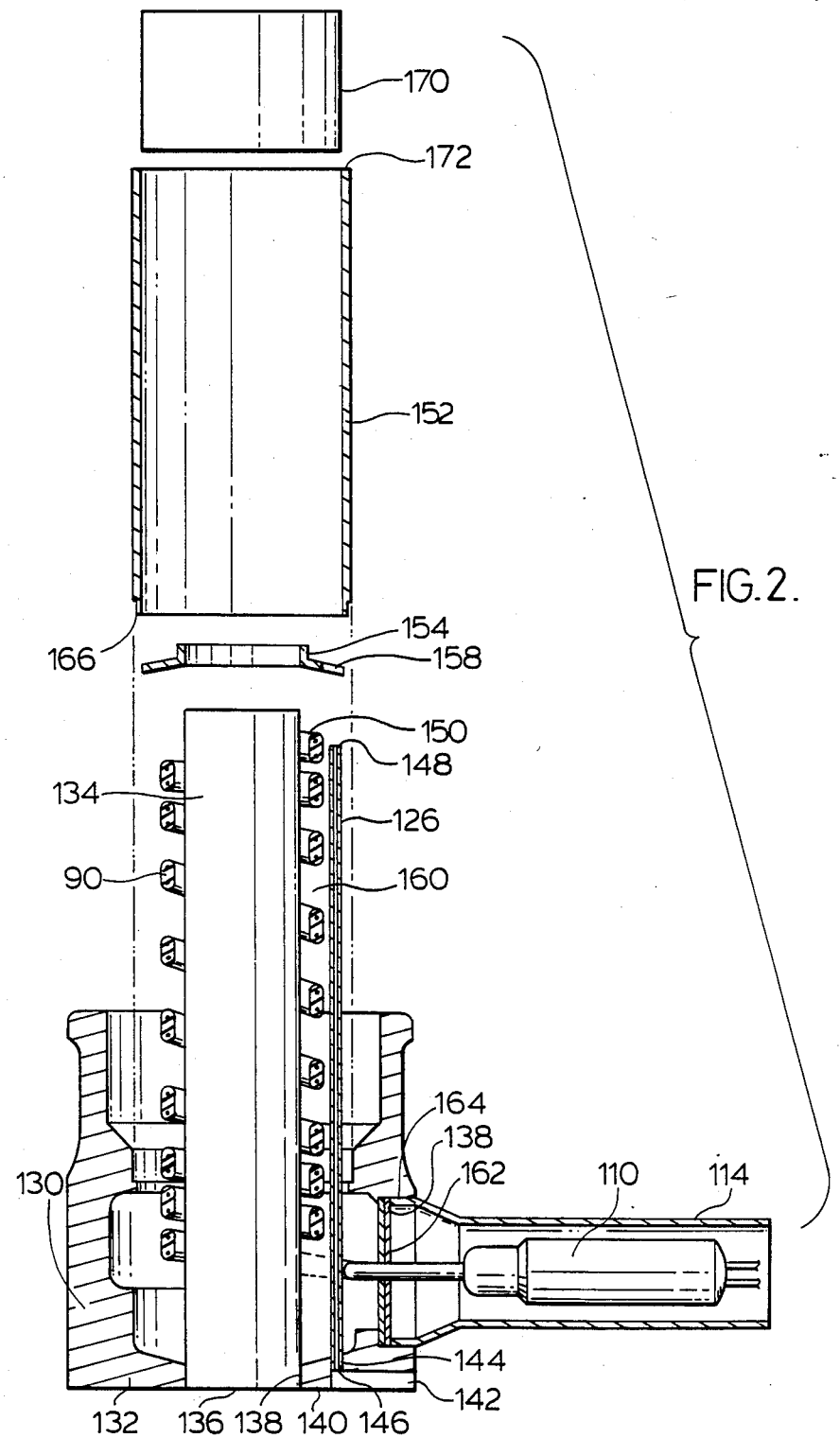
FIG. 2 is an exploded sectional view showing the assembly of a main rear portion of the nozzle seen in FIG. 1.
Figure 3:
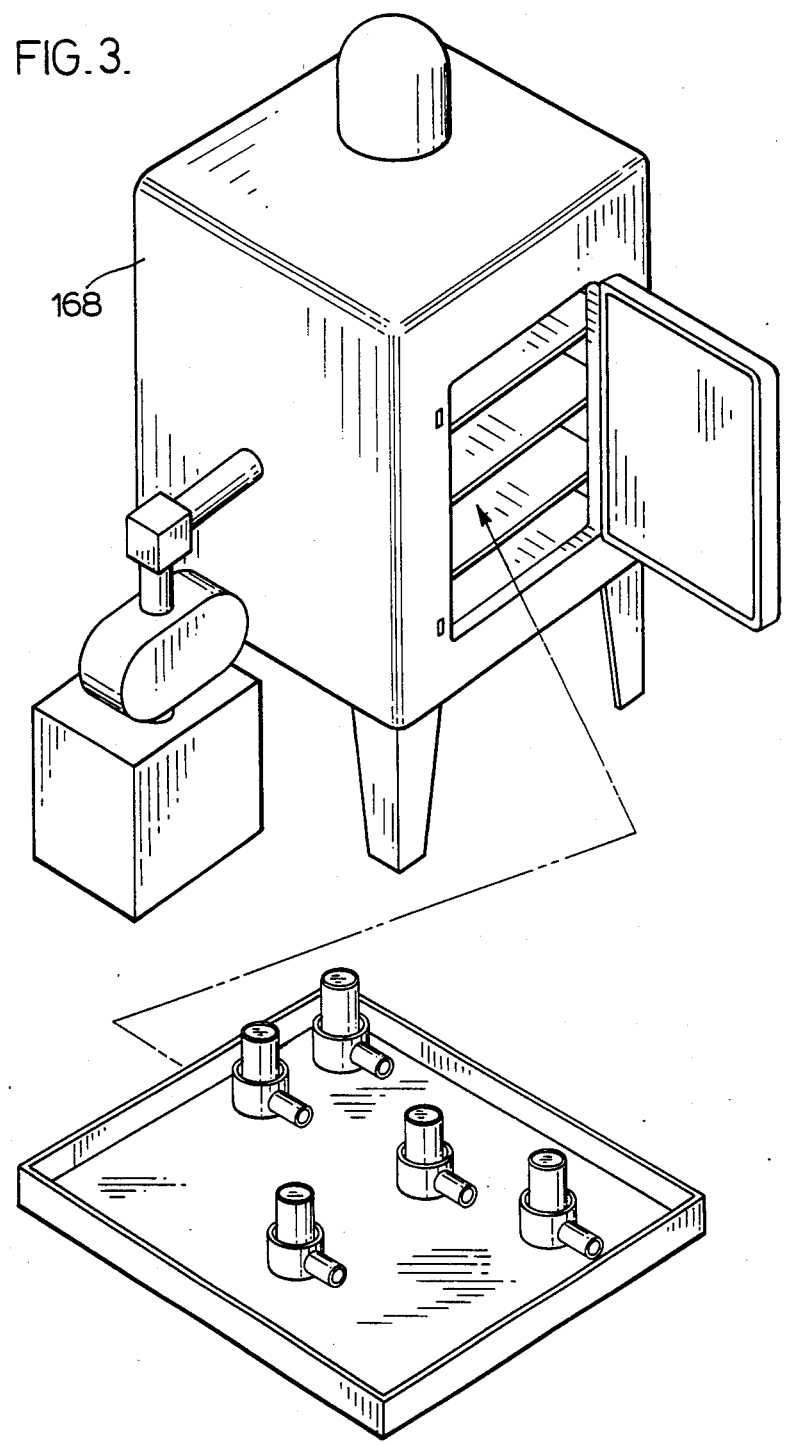
FIG. 3 shows nozzles in position on a tray for insertion into a vacuum furnace.

Reference will now be made to FIGS. 2 and 3 to describe the method of manufacturing the nozzle 10 with a gating configuration as seen in FIGS. 1 and 5. The initial step of forming the main rear portion 118 is similar to the method described in the applicant's Canadian Pat. No. 1,198,266 referred to above. The helical heating element 90 is inserted into the rear collar portion 130 of a stainless steel outer member 132. As mentioned above, the heating element 90 has a terminal portion 110 which extends laterally out through an opening 112 in the rear collar portion 130 of the outer member 132. A solid cylindrical stainless steel inner member 134 is then positioned inside the helical heating element 90, with its rear end 136 fitting into a circular opening 138 in the rear end 140 of the collar portion 130. The collar portion 130 also has a groove 142 in its rear end 140 which extends to a hole 144 drilled through it. The hollow thermocouple receiving sleeve 126 is mounted to extend outside the coils of the helical heating element 90 with an open end 146 in this hole 144 and a closed end 148 adjacent the forward end 150 of the heating element 90. The stainless steel outer member 132 also has an outer sleeve portion 152 which is inserted into the rear collar portion 130 to enclose the heating element 90 and the thermocouple sleeve 126. With the assembly standing in the upright position shown in FIG. 2, a steel spacing collar 154 is placed over the forward end 156 of the cylindrical inner member 134 where it sets on the forward end 150 of the heating element 90 inside the outer sleeve portion 152 of the outer member 132. This spacing collar locates the outer sleeve portion 152 relative to the inner member 134, and has openings 158 through it to provide for the flow of copper into the space 160 around the helical heating element 90 between the outer member 132 and the inner member 134. As described in the applicant's U.S. Pat. No. 4,403,405 which issued Sept. 13, 1983, a pair of split washers 162 are located to close the opening 138 around the terminal portion 110 of the heating element 90 to close the opening 138 in the rear collar portion 130 of the outer member 132. The protective sleeve 114 is then located over the terminal portion 110 of the heating element with one end 164 seated in the opening 138.

During the assembly described above, nickel brazing paste is applied around the rear end 136 of the inner member 134 seated in the opening 138 in the outer member 132, the rear end 146 of the thermocouple sleeve 126 seated in the hole 144 in the rear collar portion 130, the lower end 166 of the outer sleeve portion 152 seated in the rear collar portion 130, and around the split washers 162 and the end 164 of the protective sleeve 114 seated in the opening 138. The assembly is then heated in a vacuum furnace 168, as shown in FIG. 3, which causes the brazing paste to melt and run all along the various joints to seal them against leakage and to braze these components into a rigid structure. A slug of a predetermined amount of copper 170 is then placed in the upwardly projecting end 172 of the outer sleeve portion where it rests on the spacing collar 154. The assembly is then reinserted into the vacuum furnace and heated to a temperature above the melting point of copper, but below the melting point of nickel. This causes the slug of copper 170 to melt and flow down through the opening 158 in the spacing collar 154 to fill the space 160 between the outer member 132 and inner member 134 around the helical heating element 90 without melting the seals provided by the nickel brazing. Casting this copper portion 104 under a partial vacuum in the vacuum furnace 168 has been found to provide metallurgical bonding of the copper to the heating element 90, the thermocouple sleeve 126, and the inner and outer member 134, 132, which improves the transfer of heat from the heating element and distributes it more evenly along the melt passage 48. Although one arrangement is shown for casting the copper portion 104, it is apparent that other arrangements such as shown in above mentioned U.S. Pat. No. 4,403,405 can also be used. After removal from the vacuum furnace, the resulting integral main rear portion 118 is machined to remove protruding portions of the spacing collar 154 and of the outer and inner member 132, 134 to provide the main rear portion 118 with a forward end 174 having a predetermined shape.

The completed main rear portions 118 are each joined to a cup shaped nose cap portion 116 which is formed separately of H13 hot work steel. As clearly shown in FIG. 4, each nose cap portion 116 has a rear end 176 which is machined to exactly fit the forward end 174 of the main rear portion 118, except that a small central recess 178 is provided to receive brazing paste. The nose cap portion 116 must be of sufficient size and have the necessary shape to provide each of the several different desired gating configuration. A quantity of brazing paste or material is inserted into the recess 178 and the nose cap portion 116 is fitted onto the forward end 174 of the rear portion 118. They are then inserted into the vacuum furnace 178 and heated under a partial vacuum of inert gas to braze them together to form an integral nozzle. The brazing compound used is a copper alloy having a lower melting temperature than nickel or copper. Thus, the vacuum furnace is heated to a temperature high enough to melt the brazing material, but not high enough to melt the previously used nickel or copper.

Next, a thin drill is inserted into the thermocouple receiving sleeve 126 to drill through the closed end 148 to extend the thermocouple receiving bore 128 a predetermined distance into the nose cap portion 116. To facilitate drilling, the thermocouple sleeve 126 is normally in alignment with an opening 158 through the spacing collar 154, but if not, the bore 128 also is drilled through the steel collar. This provides for the insertion into the bore 128 of a removable thermocouple 88 to measure the temperature of the nose cap portion 116 adjacent the forward end 22 of the nozzle 10. As described in above mentioned Canadian Pat. No. 1,198,266, the use of this thermocouple sleeve provides for the accurate location of the thermocouple and avoids the problem of a long thin drill wandering off line and ruining a nearly completed unit. Of course, while it is desirable to provide for a thermocouple to measure temperature near the gate area, this may not be necessary for some applications and nozzles can certainly be made without it.

As mentioned above, an inventory of unfinished nozzles 10 such as this is maintained until it is apparent which of the several gating configurations shown in FIGS. 5, 6, 7 and 8 are required. Each nozzle 10 is then quickly finished by drilling and machining it to provide that particular gating configuration. Referring first to the valve gating configuration shown in FIGS. 1 and 5, the bore 54 is drilled centrally through the stainless steel inner portion 106 and the steel nose cap portion 116 from inlet 120 at the rear end 20 to an outlet 122 at the forward end 22. In this configuration, a tapered portion 124 is provided to reduce the size of the outlet 122 which is in alignment with the gate 24. As may be seen, the steel nose cap portion 116 is also machined to reduce its size and form the circumferential shoulder 98 against which the cylindrical titanium seal 100 is seated. Thus, in use, a portion 182 of the insulative air space 96 between the heated nozzle 10 and the cooled cavity plate 14 fills with melt around the forward end 22 of the nozzle. This melt provides the insulative effect to have a cool gate and the titanium seal prevents it from filling the entire air space around the nozzle. The edge gating configuration shown in FIG. 6 similarly has the nose cap portion 116 machined to form the shoulder 98 to seat the titanium seal 100. However, in this configuration, the nose cap portion 116 is also machined to form a number of radially extending channels 184 on the forward end 22 of the nozzle 10, and the central bore 54 is drilled through to connect to them. Each channel 184 leads to a small outlet 122 which, in use, is in alignment with an edge gate in the cavity plate 14, as is well known in the art.

FIG. 7 similarly shows the forward end 22 of a nozzle 10 having an edge gating configuration. However, in this case no shoulder is required to seat a titanium seal. In this case, a number of bores 186 are drilled radially in the nose cap portion 116 to connect the centrally drilled bore 54 with the radial outlets 122. Each outlet 122 is in alignment with an edge gate and is formed with an enlarged seat 188 to seat a hollow edge seal (not shown) which bridges the air space 96 to convey the melt from the outlet 122 to the respective edge gate, as described in U.S. Pat. No. 4,344,750 referred to above.

FIG. 8 shows the finishing required to provide the variable size gating configuration described in the applicant's U.S. Pat. No. 4,579,520 referred to above. In this case, the nose cap portion 116 is machined to form a cylindrical nose portion 190 which is received directly in an opening in the cavity plate 14. The central bore 54 is then drilled and machined to form a gradually tapered gate 192 in the nose cap portion 116 to receive the tip end 58 of the valve pin 56. As described in U.S. Pat. No. 4,579,520 this configuration allows the customer's moldmaker to relatively easily select one of a range of gate sizes by machining a predetermined amount off the front face 194 of the nose portion 190 and a corresponding amount off the tipe end 58 of the valve pin 56.

While the description of this invention has been given with respect to a particular embodiment, it is not to be construed in a limited sense. Variations and modifications will occur to those skilled in the art. In particular, it is apparent that the nose cap portion 116 can be shaped to provide other gating configurations. Reference is made to the claims for a definition of the invention.

What I claim is:

1. A method of manufacturing an injection molding nozzle to have a selected one of several gating configurations, the nozzle being elongated with rear and forward ends and having a helical electrical heating element integrally cast in a highly thermally conductive portion between corrosion resistant inner and outer portions, the inner portion having a central bore to convey melt from an inlet at the rear end to the selected gating configuration at the forward end having at least one outlet, comprising the steps of:
   (a) forming a main rear portion of the nozzle by assembling the helical heating element in a space between a corrosion resistant inner member and a corrosion resistant outer member, sealing the space against leakage during casting, casting highly thermally conductive material into the space to form an integral structure, and machining the rear portion to have a forward end of a predetermined shape;
   (b) forming a steel forward nose cap portion with a rear end shaped to fit the forward end of the main rear portion, the nose cap portion being of sufficient size to provide any of the several gating configurations. sufficient size to provide any of the several gating configurations.
   (c) fitting the rear portion and the nose cap portion together after applying brazing material between them, and heating them under a partial vacuum for a sufficient period of time and at a temperature to integrally braze the steel nose cap portion onto the main rear portion; and
   (d) drilling amd machining the nozzle to form the central bore which extends from the rear end of the nozzle, and to provide the nose cap portion with the predetermined selected gating configuration to connect the central bore with at least one outlet leading to a gate.

2. A method as claimed in claim 1 wherein the outer member includes a rear collar portion and an outer sleeve portion which are joined together during sealing in step (a).

3. A method as claimed in claim 2 wherein step (a) includes mounting an elongated thermocouple receiving sleeve having a thermocouple receiving bore with an open rear end and a closed forward end on the rear collar portion to be cast into the highly conductive material in a position extending forwardly between the helical heating element and the outer sleeve portion, and including the further step after the nose cap portion has been brazed in position of drilling through the closed forward end of the thermocouple receiving sleeve to provide an extension of the thermocouple receiving bore a predetermined distance into the nose cap portion, whereby a removable thermocouple can be inserted to measure temperature adjacent the forward end of the nozzle.

4. A method as claimed in claim 3 wherein step (a) includes standing the assembled rear portion on its rear end and mounting a steel spacing collar on the cylindrical inner member above the helical heating element to locate the outer sleeve portion of the outer member relative to the inner member, the collar having openings therethrough to provide for the flow of highly conductive material into the space between the inner and outer members.

5. A method as claimed in claim 4 wherein the electrical heating element has a terminal portion which extends outwardly through an opening in the outer member adjacent the rear end, further comprising mounting a seal and a connector sleeve over the terminal portion.

6. A method as claimed in claim 5 wherein sealing in step (a) includes applying brazing material around the rear end of the thermocouple receiving sleeve, around the seal and protective sleeve, and around the joints between the inner and outer members, and brazing in a vacuum furnace to form a rigid assembly and to seal the space against leakage during casting.

7. A method as claimed in claim 1 wherein the inner and outer portions are formed of stainless steel and the highly conductive material integrally cast between them is copper.

8. A method as claimed in claim 1 wherein step (d) includes machining the steel nose cap portion to form a circumferential seat to receive a hollow cylindrical seal around the outer portion of the nozzle.

9. A method as claimed in claim 8 wherein step (d) includes drilling the central bore through the nose cap portion to a central outlet to provide a valve gating configuration.

10. A method as claimed in claim 8 wherein step (d) includes machining the steel nose cap portion to form a plurality of channels, each extending radially form a plurality of channels, each extending radially outward to a small outlet on the forward end of the nozzle, and drilling the central bore through the nose cap portion to connect with the radially extending channels to provide a first edge gating configuration.

11. A method as claimed in claim 1 wherein step (d) includes drilling a plurality of radially extending bores in the nose cap portion, each connecting with the central bore and having an outlet to receive a hollow seal to provide a second edge gating configuration.

12. A method as claimed in claim 1 wherein step (d) includes machining the steel nose cap portion to form a cylindrical nose portion of reduced diameter with a central tapered gate therein, extending the central bore to connect with the tapered gate which decreases in diameter away from the bore, thus providing a gating configuration whereby a predetermined portion of the nose portion can be machined off prior to assembly of the molding system to increase the diameter of the gate to a selected size.

* * * * *